United States Patent

[11] 3,572,510

| [72] | Inventor | Samuel J. Lyda<br>Rte 2, Flat Rock, Ala. 35966 |
|---|---|---|
| [21] | Appl. No. | 818,924 |
| [22] | Filed | Apr. 24, 1969 |
| [45] | Patented | Mar. 30, 1971 |

[54] LIQUID-FUEL MONITOR FILTER
1 Claim, 6 Drawing Figs.

| [52] | U.S. Cl. | 210/502 |
|---|---|---|
| [51] | Int. Cl. | B01d 39/00 |
| [50] | Field of Search | 210/484, 489, 490, 502, 96 |

[56] References Cited
UNITED STATES PATENTS

| 2,104,519 | 1/1936 | Hurn | 210/502X |
|---|---|---|---|
| 2,554,748 | 5/1951 | Lewis et al. | 210/484 |
| 3,375,933 | 4/1968 | Rodman | 210/502 |

*Primary Examiner*—John Adee
*Attorney*—Harold C. Hogencamp

ABSTRACT: An improved filter device employing organic water-soluble resin as the filter material for effectively removing free-water and other contaminants from liquid hydrocarbon fuels and other organic liquids. Also acts as a monitor to completely shut off liquid flow when excessive free-water contaminant is present and the device has filtered to its capacity.

Patented March 30, 1971  3,572,510

Samuel J. Lyda
INVENTOR.

BY
H.C. Hogencamp
AGENT

LIQUID-FUEL MONITOR FILTER

This invention relates to an IMPROVED LIQUID-FUEL MONITOR FILTER which I chose to term the Aqua Sorb Monitor Filter.

The device described herein has a specific application for the removal of free-water content and other extraneous contaminants from hydrocarbon fuels. It can also be equally well employed to perform such filtering action with other organic liquids which are not solvents for the organic filter material. While removing the free-water, my device also removes any dissolved constituents contained therein as well as particulate solid matter. This device also acts as a monitor to shut off the flow of liquid when excess free-water contaminant is present and the device has filtered to its capacity.

The need for filters in liquid-fuel systems is apparent, particularly for aviation turbine, jet, and diesel engine fuels. Combustion can not only be hampered but can be completely extinguished when there is excessive free-water content present in aviation turbine and jet fuels. Diesel engines are now employed almost exclusively in large trucks and trailer-truck tractors, and in railroad locomotives, ships, etc. When the fuel supplied to diesel engines contains an excessive amount of free-water content, operation is very inefficient. Additional expenditures are also entailed since such diesel engines must frequently be completely overhauled by reason of internal damage caused by free-water in the fuel.

Because of the importance of removing free-water from their fuels, provision is commonly made in the fuel systems of such engines for the insertion and use of filters and/or monitors. Several makes and types of filter elements for use in such systems are presently available and being marketed.

Generally, the filter elements available employ cellulose fibrous paper and/or fiberglass as the essential filter matter materials. Organic resin materials such as phenol-formaldehyde or the like are commonly used as binders in such filters. Filters made of these materials do meet minimum requirements—even those set up in Military Specification MIL-M-8-1380 dated Jun. 22, 1966 for monitoring and removing contamination in fuel dispensing systems for aviation turbine fuel. However, presently accepted filters employing primarily cellulose and fiberglass materials leave much to be desired but, since nothing better was known, specification requirements and standards necessarily had to be written accordingly.

The present invention envisages a filter element of novel construction and material which operationally far exceeds present specifications and standards in its efficiency.

Applicant has made a discovery which he considers of outstanding importance. He has found that certain materials, heretofore employed for completely different usages, can be utilized as a filter material which far surpasses other presently and commonly used materials for the essentially complete removal of free-water content from hydrocarbon fuels and other organic liquids. In addition, this filter material, which is basically in solid crystalline powdered form as compared to the cellular or fibrous materials heretofore used for such filtering purposes, acts effectively and efficiently as a monitor to completely stop or cut off all passage or flow of liquid when the content of free-water reaches a given maximum value which saturates the filter material. In the meantime and prior to such stoppage, the fuel or organic liquid passing through the filter material is substantially absolved of any free-water contamination. The excellency of this newly discovered filter material has been proven in tests wherein sufficient free-water content has been removed from the liquid being filtered to cause such a monitor shut-off after the liquid had already passed through other highly regarded filters using cellular and fibrous filter materials. This filter material actually, and to all intents completely, removes free-water by an absorption process through which the water bonds with the filter material in such a manner as to combine the two and thereby form a completely new and different physical substance. This change in physical structure is irreversible under normal conditions.

With the foregoing in mind, the primary object of the present invention is to provide a greatly improved filter element for removal of free-water contaminant from hydrocarbon fuels and other organic liquids.

A second object is to provide, inherent in such a filter, means for monitoring and shutting-off the passage or flow of liquid when excess free-water contaminant exists and the filter element has removed its full capacity of free-water content from the liquid being filtered.

Other objects will become apparent to those skilled in the art from the following description, together with the accompanying drawing and the appended claims. In the drawing:

Referring now in more detail to the drawing depicting various physical constructions of this invention in which like numerals designate like components.

Figure 1:
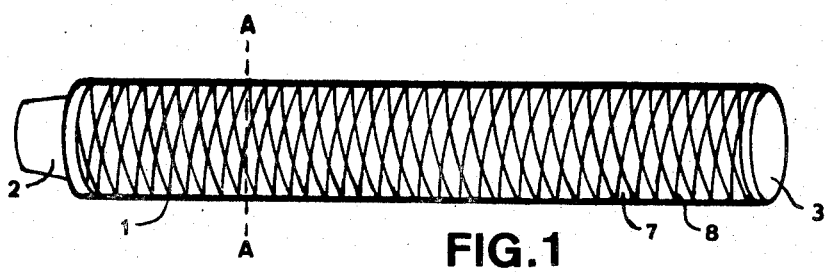
FIG. 1 is a view of one preferred construction of the device of this invention in cylindrical physical form.
Figure 2:
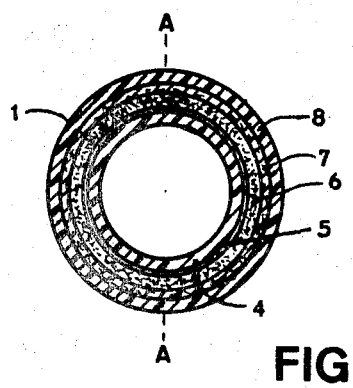
FIG. 2 is an enlarged cross section view of the construction of FIG. 1, taken on line A-A.

FIG. 1 is a view of a filter constructed in accordance with the teachings of the present invention. FIG. 2 is an enlarged cross section, taken on line A-A of FIG. 1. In the cylindrical type of construction shown, physical size and shape are indicated to be generally as set forth in previously mentioned Military Specification MIL-M-8-1380. The entire filter structure is designated as 1. End cap 2 is shaped as shown and is of generally hollow tubular construction, formed or molded from inert plastic material or metal. End cap 3, also formed or molded from the same inert plastic material or metal used for cap 2, completely seals or closes one end of the filter in this construction. In some similar tubular constructions this cap 3 might be open ended. In manufacture end caps 2 and 3 may be an integral part of the main filter structure or may be separate unities firmly attached to the main filter structure. As shown in the cross section view of FIG. 2, the filter element in this construction consists essentially of tubular layers. The innermost supporting tube 4 is simply to provide structural strength and is not a feature of the invention. Tube 4 might conveniently be a molded or tubular formed gridlike structure of material such as inert plastic, metal or fiberglass. Outside of this is another cylinder 5, which may be preshaped or formed as by rolling layers of cellulose fibrous paper, having an inert resin binder, around inner supporting form 4 or could be molded of fiberglass with a suitable binder. Leaving a substantially uniform open cylindrical space between it and cylinder 5, a preformed cylinder 7, formed as by press-molding from fiberglass, using an inert resin binder, is positioned inside of a protective outer tube 8 which might be a gridlike structure of inert plastic or metal similar to inner tube 4 but of larger diameter or could be simply a plastic or metal screen. Outer tube 8 is included primarily to provide protection in handling and is not essential to operation of the filter. In some other tubular constructions it might be omitted. The otherwise hollow space provided between inner cylinder 5 and outer cylinder 7 in the construction of FIG. 1 and FIG. 2 is completely filled with a filter material 6, basically a solid granular powder, although it might be held in calendered porous tube or sheet form. Filter material 6, preferably an organic water-soluble resin such as a form of polyethylene oxide or the like, is the nucleus of the invention. The cylindrical tubes 5 and 7 act as a means to confine filter material 6 in a tubular layer in this construction.

Figure 3:
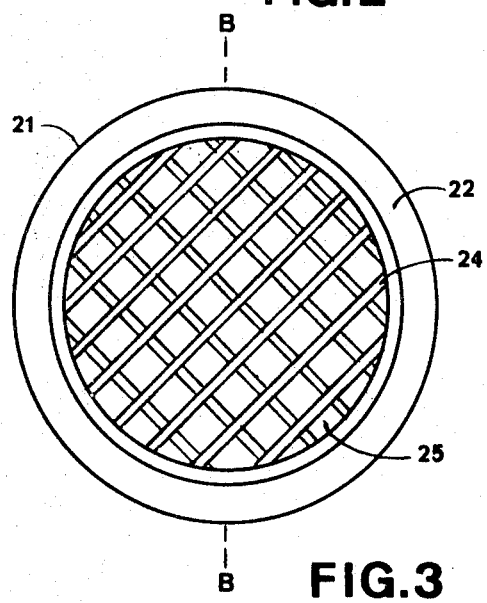
FIG. 3 shows a flat physical construction of the device in waterlike form.
Figure 4:
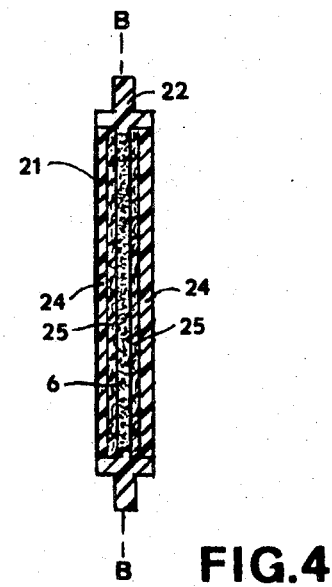
FIG. 4 is a cross section view of the flat construction shown in FIG. 3, taken on line B-B.
Figure 5:
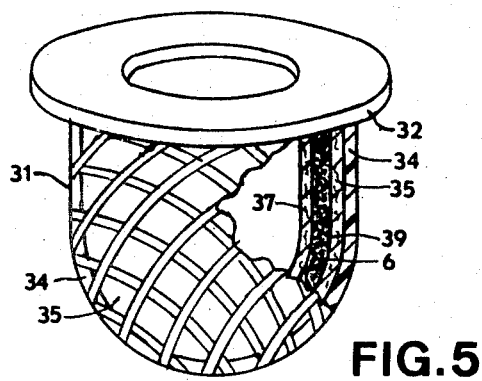
FIG. 5 shows a partially cutaway view of a baglike construction of the device.

FIG. 3, FIG. 4 and FIG. 5 of the drawing are included as a means of showing the versatility possible in the physical constructions of this invention, so that it will not be limited in structural form. Operational the filter is the same regardless of its physical formation.

FIG. 3 shows a flat filter construction in the shape of a wafer 21 having a circular edge or rim portion 22. FIG. 4 is a sectional view taken on line B–B of FIG. 3. The circular area enclosed by rim portion 22 might conveniently be covered on both external sides as shown by flat gridlike supporting structures 24–24 of inert plastic or metal or the like. Between grids 24–24 are interposed filters 25–25 similar to filters 5 and 7 of FIG. 1 and FIG. 2, which act to confine the master filter material 6, of identical organic water-soluble resin material used in the other physical constructions of the filter element. Such a wafer-shaped filter construction might be advantageously inserted directly into a pipeline having proper fittings for holding such a filter.

Figure 6:
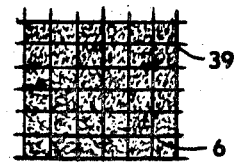
FIG. 6 is an enlarged view of one portion of the device of FIG. 5.

FIG. 5 shows a baglike or cup-shaped filter construction 31 having a flat circular rim 32. Again identical materials are employed, although different in physical shape. Such a filter might, for instance, be inserted at the filler opening or inlet of a fuel tank while it is being filled as by a hose nozzle (such as at a gas station). In this construction the preferably solid powdered form of the polyethylene oxide or like material 6, in order to prevent channeling, might be conveniently honeycombed or pressed in to fill the openings of a screen 39. This screen 39, a section of which is shown in FIG. 6, is outwardly shaped as indicated, is of desired thickness, and is made of inert plastic material, metal, or the like. The confining filter means 35—37 and the external support grid 34 are likewise of the same materials used in the other physical constructions but are shaped or formed as by molding or otherwise to meet the specific requirement of this structure.

To better explain the operation of the presently disclosed filter material, consideration should be given to the characteristics of other more conventional filter materials.

The most commonly used filter materials remove free-water by hydrophobic (repel water) or adsorption (water adheres to outer surface) whereas the filter material which is the basic ingredient of the present invention absorbs water.

The two materials used almost exclusively in prior art filters are cellulose fibrous paper and fiberglass, both being treated with an inert organic resin binder such as phenol-formaldehyde or the like. Neither of these filter materials are very effective for removing free-water from organic liquids by absorption or adsorption. Rather, both materials act to coalesce the small drops or globules of water into large drops thus causing a separation into two liquid phases, providing the organic liquid being filtered is not contaminated with a critical amount of emulsifying agents or surfactants. Unless the filtering system is equipped with a hydrophobic separator the effluent stream can readily be recontaminated from the coalesced water phase. Additional layers of the filter material do help to reduce the amount of remaining free-water. However, the organic liquid filtered through such materials in many cases still contains an appreciable amount of free-water and water-soluble contaminant.

Polyethylene, polypropylene and the copolymers thereof are sometimes used to form a coating on the surface of the fibers of filter materials. These coating materials are hydrophobic or water-repellent. Materials such as activated carbon, Fuller's earth, silica gel and activated alumina used in certain other types of liquid filters are classified as adsorbent.

It is to be particularly noted that when free-water is removed by either hydrophobic action or adsorption the water so removed still remains intact as a distinct entity and in its original liquid form.

By comparison, the free-water removed by the presently disclosed water-soluble resin filter material is fully absorbed and completely loses its entity as water since it becomes bonded with the solid granular powder to form a new physical structure. This action occurs in the manner hereinafter described.

Details of the operation of my filter will be here limited to the tubular construction shown in FIG. 1, with it its cross section viewed in FIG. 2 of the drawing.

Obviously the construction could be varied in size and relative shape to meet any other requirements for a tubular construction of the device. Operationally, other constructions such as that shown in FIG. 3 with cross section shown in FIG. 4, and that of FIG. 5 are identical in filter action. Variations in physical construction are shown only to denote the versatility of my filter device so that it can meet varying needs. Also, fuel or liquid flow could equally well be in either direction through the filter device.

The device as depicted in FIG. 1 and FIG. 2, and as physically designed to meet Military Specification MIL-M-8-1380 operates accordingly and in the following manner. One or a plurality of the filter elements are installed in a housing or encasement designed especially to hold such elements. The aviation turbine fuel, under pressure, flows into such housing externally of or outside of said filter elements, is forced through the elements by reason of exerted pressure, and emanates through the hollow interior of the filter into the pipeline which supplies fuel to the storage tanks in the aircraft which in turn later supply the turbine engines themselves. The liquid fuel therefore passes or flows successively through outer protection tube 8, outer confining filter 7, prime filter material 6, inner confining filter 5 and finally inner supporting tube 4. The fuel then emanates through hollow cap 2 into the pipeline, cap 3 closing off the other end of the filter.

As previously set forth, inner tube 4 is simply a supporting member of the construction and outer tube 8 is included simply to add protection in handling. Neither are of any import in the operation of the filter. Open-ended cap 2 acts as the path for the effluent flow while, in this construction and this type of flow path, cap 3 simply closes and blocks flow at one end of the filter element.

Actually the only vital part of the filter is the water-soluble resin material 6. However, since some type of liquid-porous material or materials are needed to confine the primary filter material 6, which is basically in solid granular powder form, the material used for the confining tubes 5 and 7 might advantageously be cellulose fibrous paper and/or fiberglass with inert organic resin binders. Thereby, additional preliminary filtering is obtained, particularly in the removal of particulate solids.

Considering the liquid flow to be from outside, inwardly, the preformed pressed fiberglass tube 7 then acts to filter out or remove particulate solid matter from the liquid. It also removes some free-water because of its water-repellent and/or adsorbent ability, even though this is actually not essential. However, free-water does still penetrate the fiberglass material 7 by reason of coalescence (as becomes evident and is readily proven).

The liquids, together with the remaining free-water, other soluble contaminants contained in said water and any remaining particulate solids penetrate through confining filter 7 to the prime filter—the water-soluble resin material 6.

The solid granular powder 6 acts to remove any remaining particulate solid contaminants but more importantly it removes by true absorption substantially all free-water that passes through the filter confining means 7. The water-soluble resin 6, in solid granular powder form has a strong affinity for water and hydrogen-bonds with it. As this solid powder 6 absorbs and combines with the water it gradually changes its physical construction or form. In so doing it absorbs much more water by weight than its own original weight, yet, until fully saturated allows the passage of hydrocarbon fuels and other organic liquids.

When the amount of excessive free-water penetrating to the filter material 6 reaches the saturation level the surfaces of the particles of powder 6 become cohesive almost immediately. During this period the particles agglomerate on contact and an impervious elastic substance is formed.

This nonporous elastic substance, although resulting from a combination of the solid powder and the liquid water, has altogether different physical properties than either alone. It is physically irreversible under normal conditions and, in this construction, forms a complete cylinder which stops or cuts off all passage or flow of liquid, including the hydrocarbon fuel or other organic fuel being filtered. It thus acts as a monitor to indicate that the free-water contamination limit has been reached. In the meantime, all free-water has been removed and none has passed through the filter into the effluent stream, since it has been combined with and bonded to the powder 6.

It is obvious that confining filter 5 has performed no duty at all in this case except to act as a confining wall for the primary filter material 6 and, of course, to allow the free passage of the liquid being filtered. If flow was reversed, operations of filter 5 and filter 7 would likewise be reversed.

If other suitable material is or becomes available, it can be used, instead of the filter materials 5 and 7, so long as it acts to confine the primary filter material 6 and is porous to the flow of the liquid being filtered, without necessarily filtering out the free-water contaminant content thereof. Only the water-soluble resin in solid granular powdered form is necessary as the free-water filter material.

From the foregoing it will be apparent that the filter action of my device differs considerably from prior art filters in the removal of free-water from an organic liquid. Particularly, the difference lies in the ability of the water-soluble resin material employed by me to bond with the free-water, thus completely removing the water content as such, and thereby forming a substance having markedly different physical properties from either component alone (solid granular powder and water). The elastic substance so formed differs from gels or gelatinous material by reason of its tenacity and this elastic substance, when fully formed, provides, a film or membrane which is impervious to the passage of liquid. Thus the filter device also acts as a monitor since by stopping the flow of the liquid being filtered positive indication is given that the original supply or source contains an excessive amount of free-water content. Such stoppage of flow assures that only fully filtered fuel passes into the storage tank and/or engine.

Since the absorption of free-water by the solid granular powder is cumulative, the usable life of such a filter device is greatly extended when there is only a minimum amount of free-water contaminant in the organic liquid being filtered.

It is to be further pointed out that certain most preferred water-soluble resins which might be employed as the primary filter material in the device of the present invention have an added desirable quality. Although instantly wettable and completely water-soluble, these resins are relatively resistant to sorption of atmospheric moisture at all but the highest relative humidities.

Obviously, since the primary purpose is to remove free-water, the granular powdered resin filter material must be preferentially soluble in water: That is; soluble in water but insoluble in the hydrocarbon fuel or other organic liquid being filtered.

In view of my disclosure it is not contemplated that there shall be any restriction of my invention by reason of size, shape, form or size of physical construction but only that my invention lies in the discovery of a new and unforeseen result in the use of a material not hitherto employed for, or thought of as, and unexcelled filter medium for the removal of free-water from a hydrocarbon fuel or other organic liquid, and a means of employing such a material in a filter device and as a fuel monitor.

Having hereby disclosed my invention, what I claim as new and desire to protect by Letters Pat. is:

I claim:

1. A filter device for removing free-water and water-soluble contaminants contained in said water from hydrocarbon fuels and other organic liquids, comprising a polyethylene oxide as the prime filter material and means for confining said filter material in a predetermined fixed shape.